US012807464B2

(12) United States Patent
Shiraki

(10) Patent No.: US 12,807,464 B2
(45) Date of Patent: Nov. 24, 2026

(54) AUTONOMOUS TRANSPORT VEHICLE AND TOWING AND TRANSPORTATION METHOD

(71) Applicant: FUJI CORPORATION, Chiryu (JP)

(72) Inventor: Shohei Shiraki, Toyota (JP)

(73) Assignee: FUJI CORPORATION, Chiryu (JP)

(*) Notice: Subject to any disclaimer, the term of this patent is extended or adjusted under 35 U.S.C. 154(b) by 369 days.

(21) Appl. No.: 18/683,460

(22) PCT Filed: Sep. 2, 2021

(86) PCT No.: PCT/JP2021/032295
§ 371 (c)(1),
(2) Date: Feb. 13, 2024

(87) PCT Pub. No.: WO2023/032124
PCT Pub. Date: Mar. 9, 2023

(65) Prior Publication Data
US 2024/0351502 A1 Oct. 24, 2024

(51) Int. Cl.
*B66F 9/06* (2006.01)
*B60P 1/02* (2006.01)
*B60P 1/64* (2006.01)
*B62D 33/02* (2006.01)
(Continued)

(52) U.S. Cl.
CPC *B66F 9/06* (2013.01); *B60P 1/02* (2013.01); *B60P 1/6409* (2013.01); *B60P 1/6445* (2013.01); *B62D 33/02* (2013.01); *B62D 33/077* (2013.01); *B62D 33/10* (2013.01); *B66F 9/063* (2013.01)

(58) Field of Classification Search
CPC .... B66F 9/06; B66F 9/063; B60P 1/02; B60P 1/6409; B60P 1/6445; B65G 2203/0216; B65G 1/10; B62D 33/02; B62D 33/077; B62D 33/10; B62D 63/02
See application file for complete search history.

(56) References Cited

U.S. PATENT DOCUMENTS

2010/0078232 A1 4/2010 Adachi
2020/0150664 A1* 5/2020 Sonoura ............... G05D 1/0274
(Continued)

FOREIGN PATENT DOCUMENTS

CN 108529493 A * 9/2018 ........... B62B 3/0618
DE 102011080857 A1 * 6/2012 ................ B66F 9/06
JP 2010-76683 A 4/2010
(Continued)

OTHER PUBLICATIONS

International Search Report Issued Oct. 19, 2021, in PCT/JP2021/032295, filed on Sep. 2, 2021, 2 pages.

*Primary Examiner* — Thomas Randazzo
(74) *Attorney, Agent, or Firm* — Oblon, McClelland, Maier & Neustadt, L.L.P.

(57) ABSTRACT

An autonomous transport vehicle includes a vehicle body that includes a traveling wheel, is configured to enter a lower side of a transported object, and is configured to travel while towing the transported object, and a weight acting portion configured to cause, in a case where a total weight of the transported object is larger than a predetermined weight, a partial weight of the total weight equal to or less than the predetermined weight to act on the vehicle body from the transported object.

13 Claims, 5 Drawing Sheets

(51) Int. Cl.
*B62D 33/077* (2006.01)
*B62D 33/10* (2006.01)

(56) References Cited

U.S. PATENT DOCUMENTS

| | | | | |
|---|---|---|---|---|
| 2021/0197900 | A1 | 7/2021 | Ranjan et al. | |
| 2022/0297992 | A1 * | 9/2022 | Sonoura | B66F 9/063 |

FOREIGN PATENT DOCUMENTS

| | | | | | |
|---|---|---|---|---|---|
| JP | 2019-64457 | A | | 4/2019 | |
| JP | 2019064457 | A | * | 4/2019 | B60P 1/02 |
| JP | 2020-77295 | A | | 5/2020 | |
| JP | 2020-183149 | A | | 11/2020 | |

* cited by examiner

AUTONOMOUS TRANSPORT VEHICLE AND TOWING AND TRANSPORTATION METHOD

TECHNICAL FIELD

The present description relates to an autonomous transport vehicle that travels while towing a transported object, and a towing and transportation method for transporting the transported object while towing the transported object.

BACKGROUND ART

In recent years, application of autonomous transport vehicles has been advanced in order to promote labor saving and automation of distribution and production. In many cases, an autonomous transport vehicle travels on a flat traveling road in a distribution warehouse or a production plant. Further, in order to handle a transported object having a weight exceeding the maximum load weight, the autonomous transport vehicle may travel while towing the transported object. In order for an autonomous transport vehicle to travel and transport stably, in addition to a traveling driving force corresponding to weights of a vehicle body and a transported object, a ground contact load sufficient to prevent traveling wheels from slipping (idling) is required. An example of a technique related to this type of autonomous transport vehicle is disclosed in Patent Literature 1.

An autonomous transport vehicle disclosed in Patent Literature 1 includes a drive unit having a right wheel, a left wheel, and a wheel driver, a turning shaft mechanism that turnably supports the drive unit with respect to a top plate, and a coil spring disposed in a vertical direction around the turning shaft mechanism in order to apply a force applied to the top plate to the right wheel and the left wheel. According to this, it is considered that ground contact loads of the right wheel and the left wheel are made substantially uniform, and traveling stability of the autonomous transport vehicle can be improved.

Patent Literature

Patent Literature 1: JP-A-2010-76683

BRIEF SUMMARY

Technical Problem

A case where an autonomous transport vehicle travels on an inclined traveling road (slope) is also assumed. In this case, a larger traveling driving force and a larger ground contact load are required as compared with a flat traveling road. Here, in a case where an own weight of a vehicle body is increased in order to secure the larger ground contact load, an even larger traveling driving force is required, and the autonomous transport vehicle becomes heavy and large. Further, even on a flat traveling road, in a case where a road surface is wet, a coefficient of friction decreases, so that traveling wheels easily slip (idle), and the same problem occurs. Further, in an autonomous transport vehicle of a type in which a current position is estimated based on a driving amount of traveling wheels, estimation accuracy of the current position is reduced because of a slip of the traveling wheels.

The above problem also occurs in the same way in a case where an autonomous transport vehicle travels while towing the transported object. In addition, in a case where a weight (load) acting on a vehicle body from the transported object is small because of dependence on a form of towing, it is difficult to secure a sufficient ground contact load of traveling wheels. Conversely, in a case where the weight acting on the vehicle body from the transported object is excessive and exceeds the maximum load weight, there is a concern that travel is destabilized or the vehicle body or the traveling wheels is damaged.

Therefore, an object of the present description is to provide an autonomous transport vehicle and a towing and transportation method capable of securing a stable ground contact load of a traveling wheel and transporting a transported object while towing the transported object even in a case where a total weight of the transported object is different on a case-by-case basis.

Solution to Problem

The present description discloses an autonomous transport vehicle including a vehicle body that includes a traveling wheel, is configured to enter a lower side of a transported object, and is configured to travel while towing the transported object, and a weight acting portion configured to cause, in a case where a total weight of the transported object is larger than a predetermined weight, a partial weight of the total weight equal to or less than the predetermined weight to act on the vehicle body from the transported object.

Further, the present description discloses a towing and transportation method including a vehicle body entering step of causing a vehicle body including a traveling wheel to enter a lower side of a transported object, a weight acting step of causing a partial weight of a total weight of the transported object equal to or less than a predetermined weight to act on the vehicle body from the transported object, and a traveling driving step of driving the traveling wheel such that the vehicle body travels while towing the transported object.

Advantageous Effects

In the autonomous transport vehicle and the towing and transportation method disclosed, the vehicle body is caused to enter the lower side of the transported object, and the partial weight of the transported object is caused to act on the vehicle body from the transported object, so that a large load obtained by adding the partial weight of the transported object to an own weight of the vehicle body acts as a ground contact load of the traveling wheel. Accordingly, even in a case where the total weight of the transported object is different on a case-by-case basis, it is possible to secure a stable ground contact load of the traveling wheel to suppress a slip (idling), and it is possible to transport the transported object while towing the transported object.

DESCRIPTION OF EMBODIMENTS

1. Overall Configuration of Autonomous Transport Vehicle 1 of Embodiment

Figure 1:
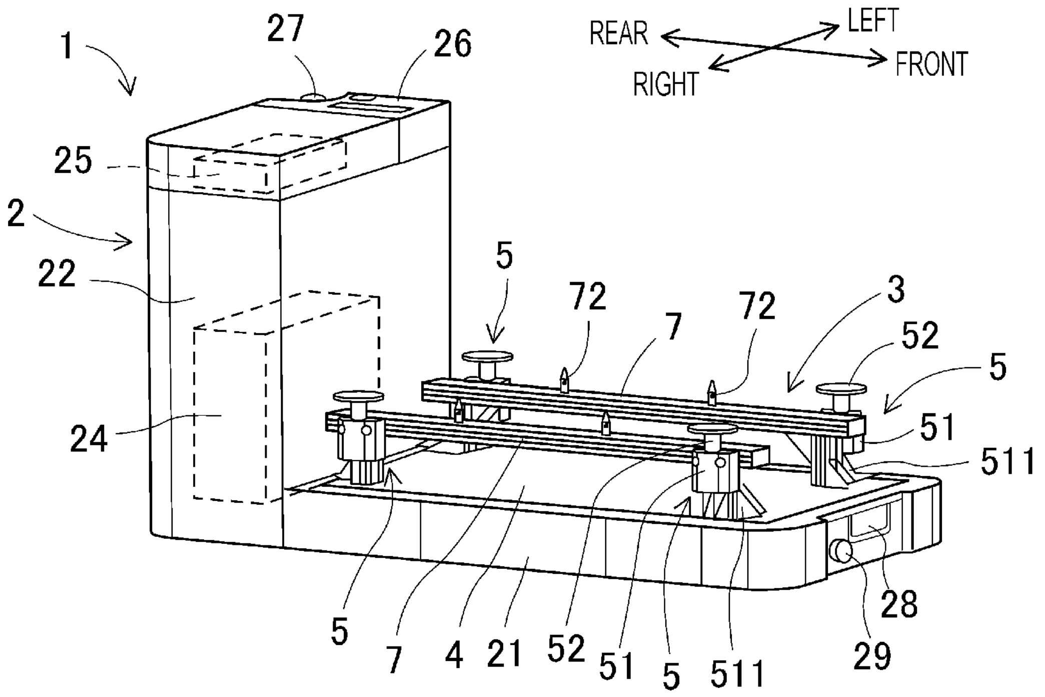
FIG. 1 is a perspective view of an autonomous transport vehicle according to an embodiment.
Figure 2:
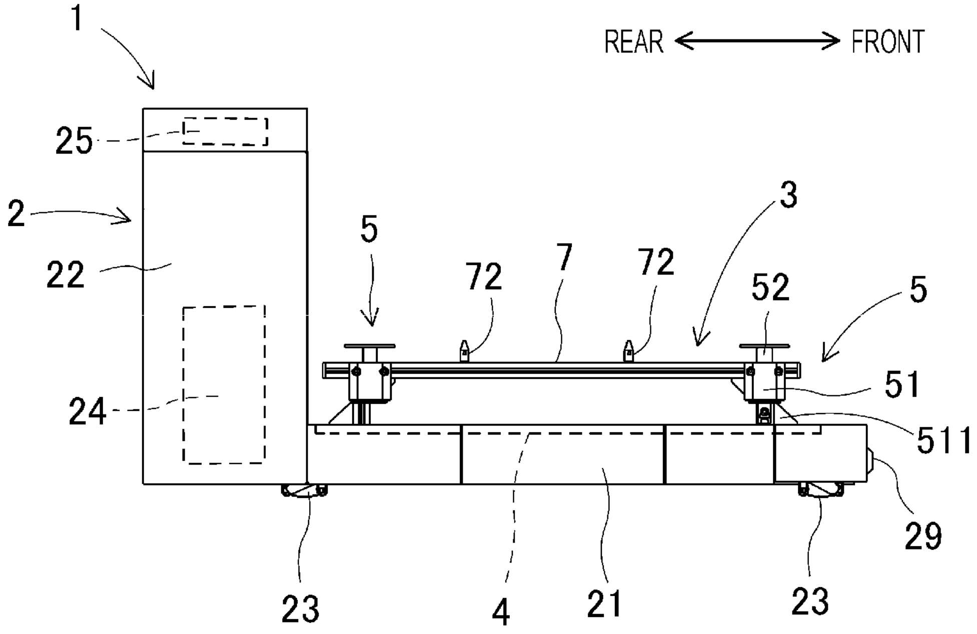
FIG. 2 is a side view of the autonomous transport vehicle before a weight acting portion operates.

First, an overall configuration of autonomous transport vehicle 1 according to an embodiment will be described with reference to FIGS. 1 to 3. As indicated by an upper right arrow in FIG. 1, front, rear, right, and left sides of autonomous transport vehicle 1 are defined for convenience. Autonomous transport vehicle 1 performs one of traveling with loading transported object 9 and traveling while towing transported object 9 based on a total weight and shape of transported object 9 different on a case-by-case basis. Autonomous transport vehicle 1 operates according to a transportation command including individual identification information of transported object 9 and a current position and target position of transported object 9. Autonomous transport vehicle 1 includes vehicle body 2 and weight acting portion 3.

Vehicle body 2 includes loading platform portion 21 on a front side and driving portion 22 on a rear side. Loading platform portion 21 is formed in a thin rectangular parallelepiped shape that has a substantially rectangular shape elongated in a front-rear direction in plan view and has a small height dimension. Loading platform portion 21 enters a lower side of transported object 9 to be transported. Driving portion 22 is formed in a vertically long rectangular parallelepiped shape that has the same width dimension as a width dimension of loading platform portion 21 in a right-left direction, has a substantially rectangular shape elongated in the right-left direction in plan view, and has a large height dimension. For loading platform portion 21 and driving portion 22, heights of bottom surfaces have been aligned.

Vehicle body 2 has four traveling wheels 23. As illustrated in FIGS. 2 and 3, two traveling wheels 23 on the front side are disposed in a forward position of the bottom surface of loading platform portion 21. Two traveling wheels 23 on the rear side are disposed on the bottom surface around a boundary between loading platform portion 21 and driving portion 22. As traveling wheels 23, four omni wheels that are driven independently by different drive motors and have different axle directions at a pitch of 90° can be used.

In this aspect, four traveling wheels 23 (omni wheels) can rotate in mutually different rotation directions, and can rotate at mutually different rotation speeds. Accordingly, a traveling direction of autonomous transport vehicle 1 is free. In addition, autonomous transport vehicle 1 is capable of traveling in various forms such as steering and spin turning. The number, a type, and an arrangement of traveling wheels 23 can be changed in various ways, without being limited thereto.

Further, Vehicle body 2 includes battery 24, control section 25, manual operation section 26, emergency stop buttons (27 and 29), and acquisition section 28. Battery 24 is disposed in a lower portion inside a housing of driving portion 22. The disposition of battery 24 having a large weight in a lower portion lowers a position of the center of gravity of vehicle body 2 and improves stability. Battery 24 supplies power to the drive motors of traveling wheels 23, control section 25, and drive section 6 (described later) of weight acting portion 3.

Control section 25 is disposed in an upper portion inside the housing of driving portion 22. Control section 25 controls operations of the drive motors of traveling wheels 23 and operation of weight acting portion 3 according to a transportation command (details will be described later). Further, control section 25 obtains a current position of autonomous transport vehicle 1 based on a detection result of a position marker using a sensor (not shown) or the like, and further determines a future traveling route. In addition, control section 25 also estimates the current position based on a driving amount of traveling wheels 23. Accordingly, in a case where a ground contact load of traveling wheels 23 is insufficient and a slip (idling) occurs, estimation accuracy of the current position decreases.

Manual operation section 26 is disposed on a left side of an upper surface of driving portion 22, and is connected to control section 25. Manual operation section 26 functions in a case where a predetermined safety condition is satisfied, and a command by a manual operation of a worker is input thereto. The predetermined safety condition is satisfied, for example, in a case where a temporary stop command is transmitted to autonomous transport vehicle 1 and autonomous transport vehicle 1 temporarily stops. Further, as a command based on a manual operation, a command for canceling a transportation command set in advance in autonomous transport vehicle 1, a command for changing a target position, or the like can be exemplified.

First emergency stop button 27 is disposed at a left rear end of the upper surface of driving portion 22. Second emergency stop button 29 is disposed on a front surface of loading platform portion 21. In a case where emergency stop button (27 or 29) is pressed by the worker or another person, a power supply circuit connecting the drive motors of traveling wheels 23 and battery 24 is cut off, and autonomous transport vehicle 1 stops in an emergency. Further, an approach detection sensor (not shown) may be provided in vehicle body 2. The approach detection sensor detects an approach of another autonomous transport vehicle 1, the worker, or the like and outputs a detection signal to control section 25. Upon receiving the detection signal, control section 25 stops autonomous transport vehicle 1 or reduces a traveling speed. Accordingly, interference between autonomous transport vehicles 1 and contact between autonomous transport vehicle 1 and the worker are avoided.

Acquisition section 28 is disposed on a left side of emergency stop button 29 on the front surface of loading platform portion 21. Acquisition section 28 acquires the individual identification information for identifying an individual of transported object 9. In the present embodiment, a two-dimensional code indicating individual identification information is displayed on transported object 9. Meanwhile, a camera can be used as acquisition section 28. Acquisition section 28 (camera) acquires the individual identification information by imaging and reading the two-dimensional code displayed on transported object 9. Acquisition section 28 can perform an imaging operation while moving with respect to transported object 9 while autonomous transport vehicle 1 is traveling. Acquisition section 28 sends the acquired individual identification information to control section 25.

Note that acquisition section 28 including a camera may also be used for detecting an obstacle in front during traveling. Further, acquisition section 28 is not limited to the above-described camera. For example, transported object 9 may include a wireless tag that transmits a wireless signal indicating the individual identification information, and acquisition section 28 may be a wireless reception section that receives the wireless signal.

The maximum load weight of autonomous transport vehicle 1 is determined in consideration of traveling stability of autonomous transport vehicle 1, mechanical strength of vehicle body 2 and traveling wheels 23, and the like. Further, the maximum towing weight is determined in consideration of traveling driving forces of the drive motors that drives traveling wheels 23, an own weight of vehicle body 2, and the like. Further, the maximum load weight or the maximum towing weight may be determined in consideration of the maximum inclination angle or quality of a road surface condition of a traveling road on which autonomous transport vehicle 1 travels. Of course, the maximum towing weight is larger than the maximum load weight. In a case where autonomous transport vehicle 1 travels while towing transported object 9 having a relatively large total weight, it is important to appropriately maintain the ground contact load of traveling wheels 23 from the viewpoint of traveling stability.

2. Configuration of Weight Acting Portion 3

Next, a configuration of weight acting portion 3 will be described with reference to FIGS. 1 to 5. Weight acting portion 3 is provided on an upper portion of loading platform portion 21 and enters the lower side of transported object 9. Weight acting portion 3 causes the total weight or partial weight of transported object 9 to act on loading platform portion 21 of vehicle body 2 from transported object 9. To cause the total weight of transported object 9 to act on loading platform portion 21 means transportation with loading. To cause a partial weight of transported object 9 to act on loading platform portion 21 means that a remaining weight is borne by transported object 9 itself, in other words, transportation while towing transported object 9. Weight acting portion 3 includes common base 4, four sets of elastic support portions 5, drive section 6 (refer to FIG. 7), and the like, and two connecting members 7 are attached thereto.

Common base 4 is a substantially rectangular plate-shaped member that occupies the majority of an upper surface area of loading platform portion 21. Common base 4 is formed of a thick member, and has high rigidity due to addition of a reinforcing member. In a case of being driven by drive section 6, common base 4 is lifted and lowered while maintaining a horizontal state. Common base 4 is lowered (refer to FIGS. 1 and 2) under a normal condition, and is driven to be lifted in a case of transporting transported object 9 (refer to FIG. 3). As drive section 6, a combination of a motor and a cam mechanism can be exemplified, and another mechanism such as a hydraulic drive mechanism can also be used.

Figure 4:
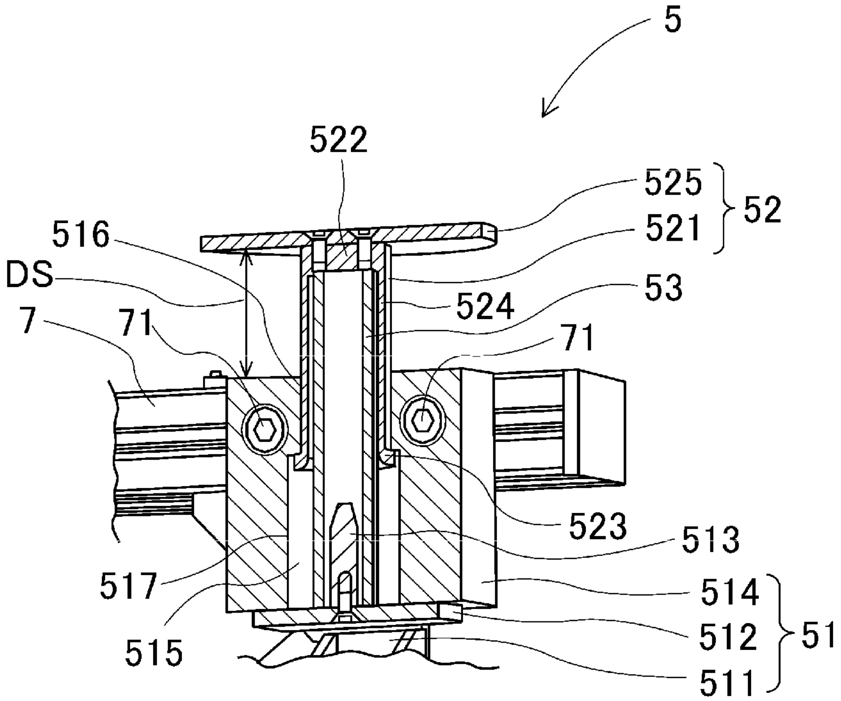
FIG. 4 is a side cross-sectional view illustrating a state of an elastic support portion before the weight acting portion operates.

Four sets of elastic support portions 5 are respectively disposed in the vicinity of four corners of common base 4. The number of sets of elastic support portions 5 is not limited to four sets, and can be changed. Elastic support portions 5 are provided on loading platform portion 21 via common base 4 so as to be capable of being lifted and lowered, and support transported object 9 from the lower side via elastic body 53. As illustrated in FIG. 4, each of elastic support portions 5 includes base body 51, support body 52, and elastic body 53.

Base body 51 is formed of base member 511, bottom plate member 512, cylinder member 514, and the like. Base member 511 is formed to have a large bottom portion and a small upper portion, and a reinforcing stay whose reference numeral is omitted is added. The bottom portion of base member 511 is fixed to common base 4. Bottom plate member 512 is a rectangular plate-shaped member. Bottom plate member 512 is horizontally fixed to an upper side of base member 511. Support pin 513 is disposed to stand upward at a center of bottom plate member 512 and is fixed using a fastening screw whose reference numeral is omitted. Cylinder member 514 is a member which has a central axis extending in a vertical direction and in which cylinder space 515 having an opening in an up-down direction is formed. Cylinder member 514 is fixed to an upper side of bottom plate member 512. Cylinder space 515 is formed in a stepped cylindrical shape having small-diameter portion 516 on an upper side and a large-diameter portion 517 on a lower side.

Support body 52 is formed of piston member 521, support member 525, and the like. Piston member 521 is a bottomed cylindrical member having a central axis common to cylinder member 514. Specifically, piston member 521 has bottom portion 522 at an upper portion of cylindrical portion 524, and a lower portion of cylindrical portion 524 is flange 523 having an increased diameter. Support member 525 is a circular plate-shaped member. Support member 525 is horizontally disposed on an upper side of bottom portion 522 of piston member 521, and is fixed using a fastening screw whose reference numeral is omitted. Support member 525 supports a bottom portion of transported object 9 (a lower surface of bottom plate 91) from below.

A lower portion of piston member 521 constituting support body 52 is disposed in cylinder space 515 of cylinder member 514 so as to be capable of being lifted and lowered. Further, support member 525 constituting support body 52 is disposed above cylinder member 514. Bottom portion 522 and cylindrical portion 524 of piston member 521 can be lifted and lowered in small-diameter portion 516. Meanwhile, flange 523 of piston member 521 can be lifted and lowered in large-diameter portion 517, but cannot enter small-diameter portion 516. This prevents support body 52 from being detached upward.

Elastic body 53 is provided between base body 51 and support body 52. Specifically, elastic body 53 is used in a form in which a coil spring (shown in a cylindrical shape for convenience in FIG. 4) capable of expanding and contracting in the up-down direction is applied and a stress is generated by compression. A lower end of elastic body 53 is supported by engagement of support pin 513 of base body 51. An upper end of elastic body 53 is pressed against bottom portion 522 of support body 52. An intermediate portion of elastic body 53 is held inside cylindrical portion 524 of support body 52, and is prevented from being deformed in a direction other than an expansion and contraction direction. In manufacture of elastic support portion 5, after piston member 521 and elastic body 53 are incorporated into cylinder member 514, bottom plate member 512 with support pin 513 and support member 525 are attached.

As illustrated in FIG. 4, a stress generated in elastic body 53 is small at a lifted position of support body 52 in which flange 523 is located at an upper end of large-diameter portion 517. Meanwhile, in a case where elastic support portion 5 is driven to be lifted, support body 52 is lifted at the beginning. In a case where support body 52 is further lifted and comes into contact with the lower side of transported object 9, support body 52 cannot be lifted thereafter. In a case where elastic support portion 5 is further driven to be lifted, support body 52 maintains a height thereof, and is relatively lowered with reference to base body 51.

Figure 5:
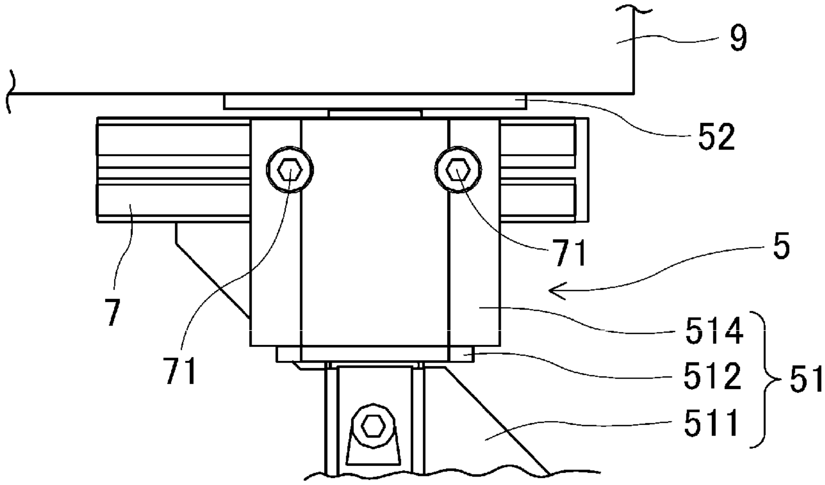
FIG. 5 is a side view illustrating a state of the elastic support portion after the weight acting portion has operated.

Accordingly, bottom portion 522 of support body 52 receiving the weight of transported object 9 presses elastic body 53 downward to compress elastic body 53. As illustrated in FIG. 5, support body 52 can be lowered to a predetermined lowered position with reference to base body 51. At a predetermined lowered position, support member 525 is lowered by lowering stroke length DS (refer to FIG. 4) and comes into contact with cylinder member 514. At the same time, flange 523 is lowered to the vicinity of a lower end of large-diameter portion 517. Alternatively, flange 523 may be lowered to the lower end of large-diameter portion 517 and come into contact with bottom plate member 512, and support member 525 may be lowered to a position close to cylinder member 514.

In a case where support body 52 is lowered to the lowered position, elastic body 53 is compressed by lowering stroke length DS, and a stress equal to a predetermined weight is generated. This stress has a magnitude that is balanced with the weight acting on support body 52 from transported object 9. This stress acts on loading platform portion 21 via base body 51 and common base 4.

In the present embodiment, the predetermined weight is determined to be one fourth of the maximum load weight of autonomous transport vehicle 1. In other words, a sum of the predetermined weights of four elastic bodies 53 matches the maximum load weight. Accordingly, stresses equal to the maximum load weight in total is generated in four elastic bodies 53. In this case, an amount corresponding to the maximum load weight of the weight of transported object 9 acts on loading platform portion 21 from transported object 9 via elastic support portion 5. A sum of the amount corresponding to the maximum load weight of transported object 9 and the own weight of vehicle body 2 acts on four traveling wheels 23 to be the ground contact load.

Note that various factors such as a spring constant and lowering stroke length DS of elastic body 53 are designed such that the above-described stress is generated. Even in this case, the stress generated in four elastic bodies 53 may include some manufacturing errors resulting from a dimensional tolerance of the members, an operation error during an assembly operation, or the like.

Further, in a case where a lifting amount of elastic support portion 5 is small, support body 52 is lowered by a stroke length shorter than lowering stroke length DS with reference to base body 51. In other words, support body 52 may stop in the middle of being lowered, instead of being lowered to the predetermined lowered position. In this case, stresses equal to a partial weight smaller than the maximum load weight in total is generated in four elastic bodies 53. In this case, an amount corresponding to the partial weight of the total weight of transported object 9 acts on loading platform portion 21 from transported object 9. A sum of the amount corresponding to the partial weight of transported object 9 and the own weight of vehicle body 2 acts on four traveling wheels 23 to be the ground contact load.

Two connecting members 7 respectively connect two front and rear base bodies 51. As connecting member 7, for example, square rod-shaped section steel is used. Connecting member 7 is fastened to front and rear base bodies 51 (cylinder members 514) using two fastening bolts 71. Connecting member 7 is provided to increase mechanical rigidity. Four connecting members 7 may be disposed to be a rectangular shape, and right and left base bodies 51 may be connected together. Each of connecting members 7 has pressing portions 72 at two positions on an upper surface. Pressing portion 72 is provided to stand upward from the upper surface of connecting member 7, and is formed in, for example, a conical shape or a round rod shape. An upper end of pressing portion 72 extends to a position higher than an upper surface of support body 52 (support member 525).

Figure 3:
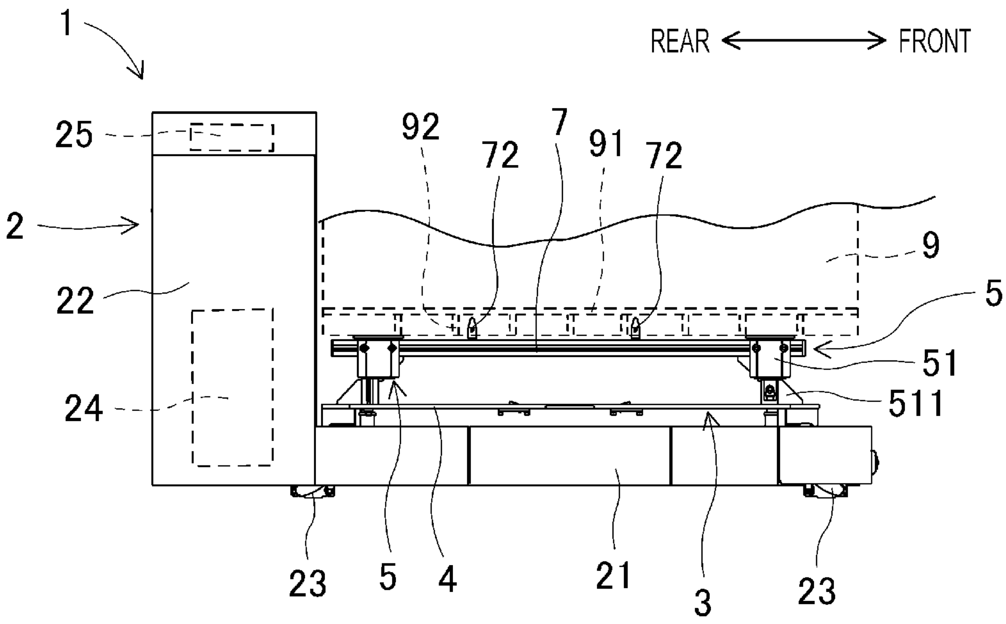
FIG. 3 is a side view of the autonomous transport vehicle in which the weight acting portion has operated below a transported object.

As illustrated in FIG. 3, bottom plate 91 of transported object 9 is formed with contacted portion 92 protruding downward in a lattice shape. In a case where loading platform portion 21 enters the lower side of transported object 9, common base 4 is lowered, and pressing portion 72 passes a lower side of contacted portion 92. Thereafter, in a case where weight acting portion 3 operates, connecting member 7 is lifted integrally with common base 4 and base body 51. Accordingly, pressing portion 72 is lifted to a height of contacted portion 92. Then, as vehicle body 2 travels, pressing portion 72 comes into contact with contacted portion 92 from a lateral side and presses transported object 9. According to this, in both cases of loading and towing, transported object 9 does not go through a significant lateral skid with respect to four elastic support portions 5, and is stably transported.

Here, there are cases where autonomous transport vehicle 1 is traveling and suddenly stops because of some reasons. In this case, a large inertial force in a horizontal direction is generated because of a sudden stop of transported object 9, and acts on pressing portion 72 from contacted portion 92. In this case, since the large inertial force is divided and transmitted from pressing portion 72 to front and rear base bodies 51 via connecting member 7, a deformation amount of front and rear elastic support portions 5 is small, and there is no concern of breakage. That is, by providing connecting member 7, it is possible to increase the mechanical rigidity against the large inertial force from transported object 9 generated in a case where autonomous transport vehicle 1 suddenly stops.

3. Transported Object 9

Figure 6:
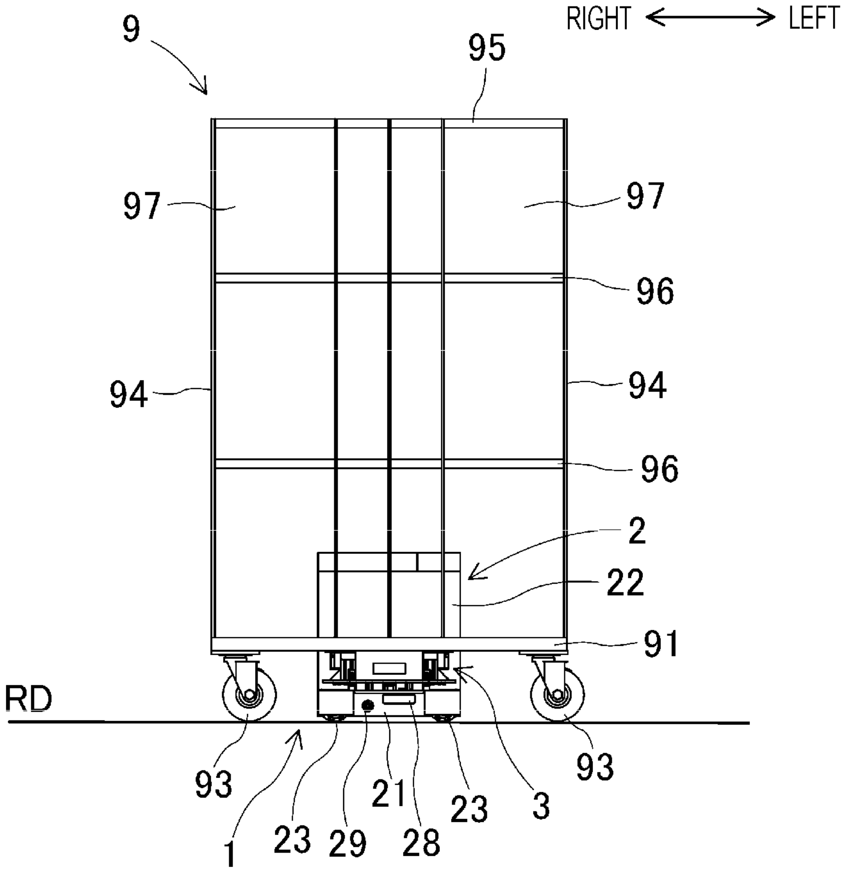
FIG. 6 is a front view illustrating a state in which the autonomous transport vehicle is traveling in a right-left direction while towing a transported object.

Next, an example of transported object 9 will be described with reference to FIG. 6. In the present embodiment, transported object 9 is a roll container on which multiple packages can be placed, and is not limited thereto. As illustrated in FIG. 6, transported object 9 (roll container) includes bottom plate 91, two side plates 94, top plate 95, two inventory plates 96, and curtain 97. Bottom plate 91, two side plates 94, and top plate 95 form a rectangular parallelepiped frame that has openings in front and rear.

Bottom plate 91 has contacted portion 92 described above and four casters 93 whose traveling directions freely change. Further, the two-dimensional code (not shown) described above is displayed on front and rear sides of bottom plate 91. A height of a bottom surface of bottom plate 91 varies depending on individual differences of transported objects 9. Two inventory plates 96 are disposed horizontally while being vertically separated so as to divide an inside of the frame into approximately three equal parts. Packages are placed on upper surfaces of two inventory plates 96 and bottom plate 91. Curtain 97 is formed using a transparent and flexible resin sheet. Curtain 97 is disposed so as to cover front and rear sides of the frame in an openable and closable manner.

The total weight of transported object 9 is obtained by adding an own weight of transported object 9 to a weight of the packages placed thereon. Accordingly, the total weight of transported object 9 varies depending on a type and the number of the packages placed on a case-by-case basis. Further, there are multiple types of transported objects 9 having different height dimensions. A height dimension of transported object 9 illustrated in FIG. 6 is close to four times a height dimension of autonomous transport vehicle 1, and it cannot be said that stability is good in a case where transported object 9 is loaded and transported. Accordingly, even in a case where transported object 9 is unloaded and the total weight of transported object 9 is smaller than the maximum load weight, autonomous transport vehicle 1 tows that transported object 9 without loading that transported object 9 and performs stable transportation.

In FIG. 6, casters 93 of transported object 9 are oriented in a right-left direction of the drawing, and autonomous transport vehicle 1 travels on road surface RD while towing unloaded transported object 9 in the right-left direction. In a case where the traveling direction of autonomous transport vehicle 1 changes, a traveling direction of casters 93 also changes accordingly, so that autonomous transport vehicle 1 can stably travel even while towing transported object 9. Meanwhile, autonomous transport vehicle 1 transports a transported object having a relatively small height dimension and a total weight smaller than the maximum load weight by elevating the transported object from road surface RD and loading the transported object.

4. Configuration Related to Control of Autonomous Transport Vehicle 1

Figure 7:
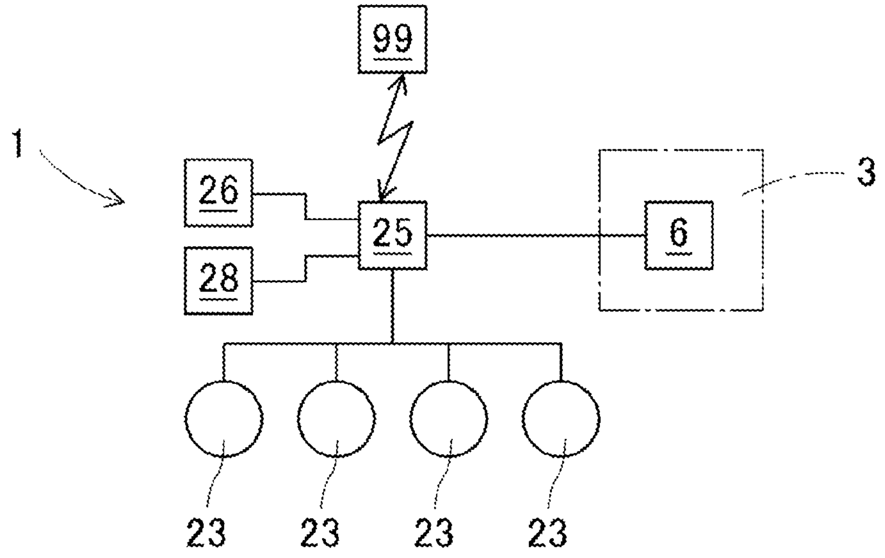
FIG. 7 is a block diagram illustrating a configuration of control of the autonomous transport vehicle.
Figure 8:
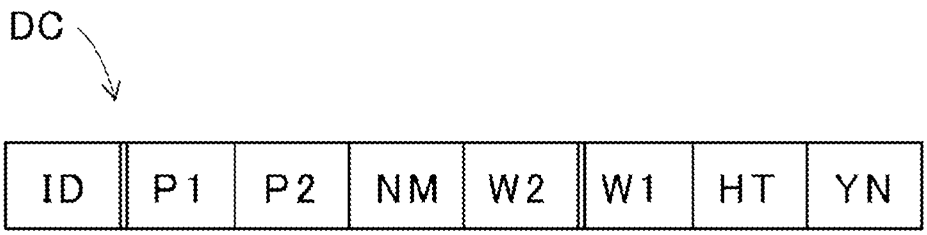
FIG. 8 is a diagram conceptually illustrating a data format of transported object data set for each transported object.

Next, a configuration related to control of autonomous transport vehicle 1 will be described with reference to FIGS. 7 and 8 together with management of transported object 9. As illustrated in FIG. 7, control section 25 separately controls the four drive motors so as to separately control the rotation directions and the rotation speeds of four traveling wheels 23. Further, control section 25 is connected to manual operation section 26, and receives a command by a manual operation of the worker. Further, control section 25 is connected to acquisition section 28 and receives the individual identification information of transported object 9 acquired by acquisition section 28. Further, control section 25 controls drive section 6 of weight acting portion 3.

Further, control section 25 is wirelessly communicably connected to transported object management section 99. Transported object management section 99 manages operating of multiple transported objects 9 using transported object data DC illustrated in FIG. 8. Transported object data DC is set for each of multiple transported objects 9. Transported object data DC has a data format in which individual identification information ID is associated with other management information. In the present embodiment, the other management information includes seven items: current position information P1, target position information P2, package name NM, package weight information W2, own weight information W1, bottom portion height information HT, and loading possibility information YN.

Individual identification information ID is information displayed on each of transported objects 9 as described above and acquired by acquisition section 28. Current position information P1 is information indicating the current position of transported object 9. As an expression format of current position information P1, for example, two-dimensional coordinate values of a field in which autonomous transport vehicle 1 travels or position numbers of multiple stop positions at which transported object 9 is stopped or stored are used. Each position number is associated in advance with a two-dimensional coordinate value of the field. Target position information P2 is information indicating a position of a transport destination to which autonomous transport vehicle 1 transports transported object 9. Target position information P2 is blank in a case where it is not necessary to transport transported object 9, and is set in a case where transported object 9 is transported. Target position information P2 is expressed in the same expression format as current position information P1.

Package name NM is information obtained by encoding a name of the package placed on transported object 9. Package weight information W2 is information corresponding to an added value obtained by adding each weight of the multiple packages placed on transported object 9. Package name NM and Package weight information W2 are sequentially updated by the worker or a work robot in a case where the worker or the work robot loads and unloads the packages. The four items are changing information that changes with time: current position information P1, target position information P2, package name NM, and package weight information W2.

Own weight information W1 is information on the own weight of transported object 9. The total weight of transported object 9 can be automatically obtained by adding own weight information W1 and package weight information W2. Bottom portion height information HT is information indicating a height from road surface RD of each bottom plate 91 of transported objects 9 having individual differences. Loading possibility information YN is information that determines whether transportation with loading is possible. For example, for transported object 9 having a large height dimension (refer to FIG. 6), loading possibility information YN is set to “impossible to transport with loading”. The three items are fixed information that does not change under a normal condition and may change in a case where transported object 9 is modified or repaired: own weight information W1, bottom portion height information HT, and loading possibility information YN.

Transported object management section 99 transmits a transportation command including transported object data DC in which target position information P2 is set to autonomous transport vehicle 1. Autonomous transport vehicle 1 transports transported object 9 based on transported object data DC included in the transportation command. Transported object management section 99 may transmit a transportation command including multiple pieces of transported object data DC, and autonomous transport vehicle 1 may sequentially transport multiple transported objects 9 in accordance with an arrangement order of the multiple pieces of transported object data DC.

5. Operation of Autonomous Transport Vehicle 1

Figure 9:
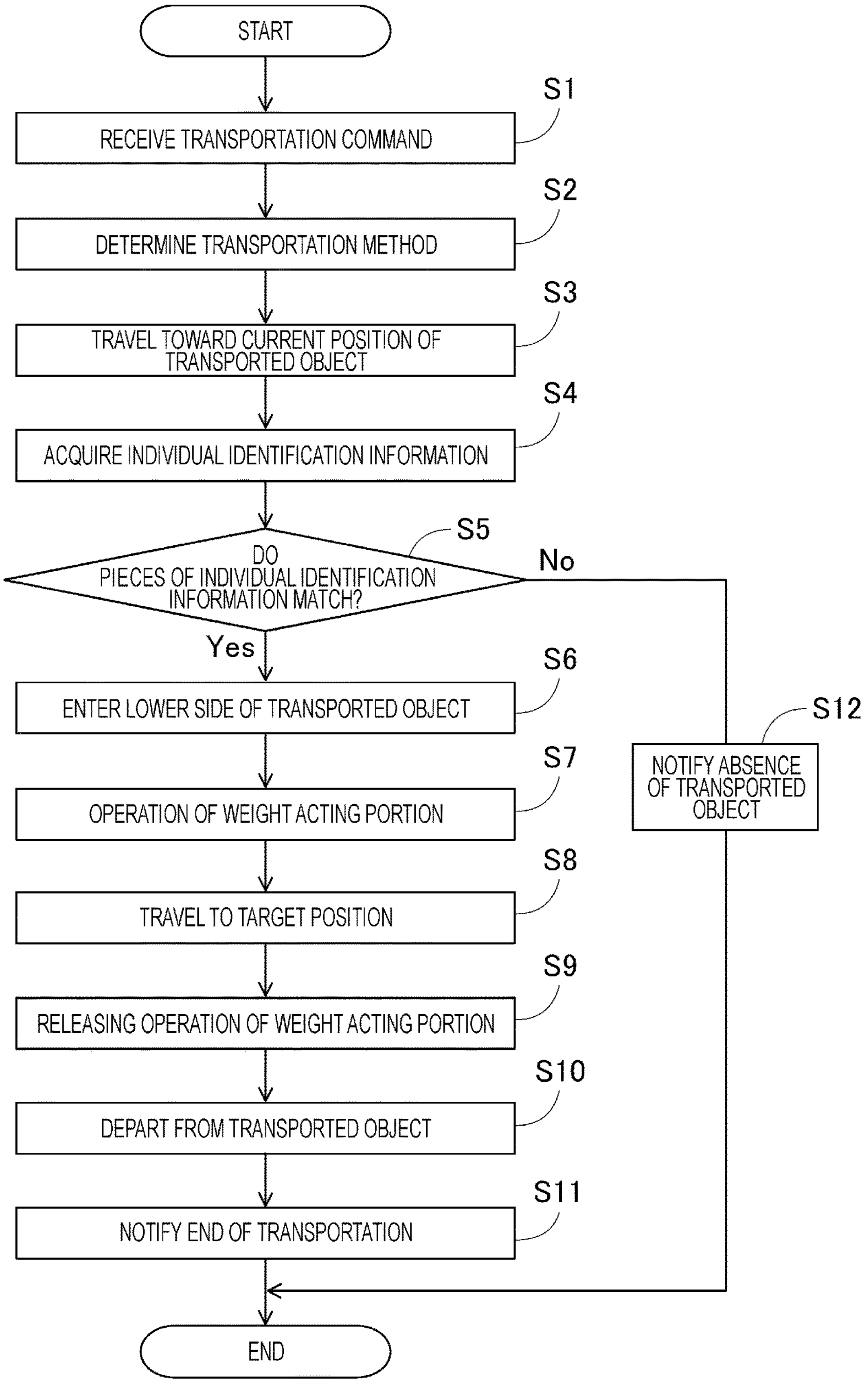
FIG. 9 is a diagram of an operation flow illustrating a transportation operation of autonomous transport vehicle.

Next, the operation of autonomous transport vehicle 1 will be described with reference to FIG. 9. The following description includes description of a towing and transportation method of the embodiment. An operation flow illustrated in FIG. 9 is advanced mainly under the control of control section 25. In step S1 of FIG. 9, control section 25 receives a transportation command from transported object management section 99. In next step S2, control section 25 determines a transportation method for transported object 9 based on transported object data DC included in the transportation command. Specifically, control section 25 determines whether to load transported object 9 or to tow transported object 9, and determines an operation condition of weight acting portion 3 in a case of towing transported object 9.

Specifically, in a case where loading possibility information YN included in transported object data DC indicates that "impossible to transport with loading", control section 25 determines to tow transported object 9. Further, in a case where loading possibility information YN indicates "possible to transport with loading", control section 25 determines to load transported object 9 in a case where the total weight of transported object 9 is equal to or less than the maximum load weight, and determines to tow transported object 9 in a case where the total weight of transported object 9 exceeds the maximum load weight. Further, for example, in a case where the total weight of transported object 9 exceeds the maximum towing weight, control section 25 notifies transported object management section 99 that transported object 9 cannot be transported, and ends the operation flow.

In a case where it is determined that transported object 9 is loaded, control section 25 determines a lifting amount that is large enough to elevate transported object 9 from road surface RD as a lifting amount by which drive section 6 of weight acting portion 3 causes common base 4 to be lifted. Further, in a case where it is determined that transported object 9 is towed, control section 25 determines a lifting amount by which drive section 6 causes common base 4 to be lifted based on the total weight of transported object 9 and bottom portion height information HT. Determination patterns include following (1), (2), and (3), and (2) may be merged into (1).

(1) In a case where the total weight of transported object 9 exceeds the maximum load weight (predetermined weight), control section 25 adds lowering stroke length DS to a separation distance between support body 52 and bottom plate 91 of transported object 9 to obtain a lifting amount. In this case, in a case where common base 4 is lifted, as illustrated in FIG. 5, support body 52 is lowered to the lowered position with reference to base body 51. Accordingly, the sum of the amount corresponding to the maximum load weight of transported object 9 and the own weight of vehicle body 2 acts on four traveling wheels 23 to be the ground contact load. In consideration of a manufacturing error of the stress generated in four elastic bodies 53, an error of unevenness of road surface RD, or the like, control section 25 may reduce the lifting amount by an amount corresponding to the error. Accordingly, it is possible to avoid a concern that a load exceeding the maximum load weight acts on loading platform portion 21.

(2) In a case where the total weight of transported object 9 exceeds the maximum load weight but an excess amount is equal to or less than a predetermined reducible weight, control section 25 adds the above-described separation distance and a reduction stroke length obtained by multiplying lowering stroke length DS by a first reduction rate less than 1 to obtain a lifting amount. In this case, in a case where common base 4 is lifted, support body 52 stops in the middle of being lowered, instead of being lowered to the lowered position with reference to base body 51. Accordingly, the sum of the amount corresponding to the partial weight of transported object 9 and the own weight of vehicle body 2 acts on four traveling wheels 23 to be the ground contact load. That is, in a case where an excess amount is not so large, it is not necessary to apply the maximum load weight from transported object 9 to traveling wheels 23, and a certain degree of reduction is allowed. Accordingly, for example, by setting the first reduction rate to 50%, a partial weight that is half the maximum load weight is applied from transported object 9 to traveling wheels 23 via loading platform portion 21, thereby obtaining a sufficient ground contact load.

(3) In a case where the total weight of transported object 9 is equal to or less than the maximum load weight, control section 25 adds the above-described separation distance and a stroke length obtained by multiplying lowering stroke length DS by a second reduction rate to obtain a lifting amount. The second reduction rate is set within a range in which transported object 9 is not elevated from road surface RD. For example, in a case where the total weight of transported object 9 is 60% of the maximum load weight, the second reduction rate is set to a range of 0% or more and less than 60% (refer to Hooke's law). In a case where the second reduction rate is 0%, transported object 9 is self-standing while bearing the total weight of transported object 9 and is pressed by pressing portion 72. Further, in a case where the second reduction rate approaches 60%, elastic body 53 is compressed by that amount, and most of the total weight of transported object 9 acts on traveling wheels 23 via loading platform portion 21.

In next step S3, autonomous transport vehicle 1 travels toward the current position of transported object 9 indicated by current position information P1. Step S3 can be executed in parallel with step S2. In step S4 during traveling, acquisition section 28 acquires the individual identification information of transported object 9 while approaching transported object 9 and sends the individual identification information to control section 25. In next step S5, control section 25 checks whether the individual identification information received from acquisition section 28 matches individual identification information ID included in transported object data DC received from transported object management section 99.

In a case where two pieces of individual identification information ID do not match, and in a case where acquisition section 28 cannot acquire the individual identification information from transported object 9, the execution of the operation flow branches to step S12. In step S12, control section 25 notifies transported object management section 99 that commanded transported object 9 is absent (not found), and ends the operation flow.

In step S6, in a case where two pieces of individual identification information ID match, loading platform portion 21 and weight acting portion 3 of autonomous transport vehicle 1 enter the lower side of transported object 9. In next step S7, weight acting portion 3 operates based on any one of the determination patterns (1) to (3) described above. In any one of the determination patterns, elastic support portion 5 and connecting member 7 is lifted. Accordingly, support body 52 supports bottom plate 91 of transported object 9, and elastic body 53 is compressed and deformed. Further, pressing portion 72 is lifted to a height at which pressing portion 72 can come in to contact with contacted portion 92 from the lateral side. Accordingly, transported object 9 is loaded on loading platform portion 21 and can be towed by loading platform portion 21.

In next step S8, control section 25 drives traveling wheels 23. Accordingly, autonomous transport vehicle 1 loads transported object 9 and travels to the target position indicated by target position information P2. Autonomous transport vehicle 1 travels to the target position while towing transported object 9 while pressing portion 72 presses contacted portion 92.

Here, in a case where the total weight of transported object 9 exceeds the maximum load weight, the maximum load weight or the partial weight of the total weight of transported object 9 acts on loading platform portion 21 because of the action of elastic support portion 5. According to this, the sum of the maximum load weight or partial weight of transported object 9 and the own weight of vehicle body 2 acts on four traveling wheels 23 to be the ground contact load. Accordingly, a stable ground contact load of traveling wheels 23 can be secured, and autonomous transport vehicle 1 can transport transported object 9 while towing transported object 9. Further, even in a case where road surface RD of the traveling road has some unevenness or steps, autonomous transport vehicle 1 can transport transported object 9 while towing transported object 9.

Further, since the stable ground contact load is secured, traveling wheels 23 is less likely to slip (idle). Accordingly, the estimation accuracy of the current position estimated from the driving amount of traveling wheels 23 does not decrease.

In next step S9, weight acting portion 3 performs a releasing operation. That is, drive section 6 cause common base 4 to perform a lowering operation to generate a separation distance between support body 52 and bottom plate 91 of transported object 9. In next step S10, loading platform portion 21 and weight acting portion 3 exit from the lower side of transported object 9. Accordingly, autonomous transport vehicle 1 leaves transported object 9 at the target position and departs from transported object 9. In next step S11, control section 25 notifies transported object management section 99 that the commanded transportation has ended. Transported object management section 99 moves the content of target position information P2 to current position information P1 and makes target position information P2 blank. As a result, the operation flow corresponding to one transportation command is ended.

In autonomous transport vehicle 1 of the embodiment, loading platform portion 21 of vehicle body 2 is caused to enter the lower side of transported object 9, and the partial weight of transported object 9 is applied from transported object 9 to loading platform portion 21, so that a large load obtained by adding the partial weight of transported object 9 to the own weight of vehicle body 2 acts as the ground contact load of traveling wheels 23. Accordingly, even in a case where the total weight of transported object 9 is different on a case-by-case basis, it is possible to secure the stable ground contact load of traveling wheels 23 to suppress a slip (idling), and it is possible to transport transported object 9 while towing transported object 9.

6. Modification and Application of Embodiment

The predetermined weight can be set to be smaller than the maximum load weight. For example, the spring constant of elastic body 53 is made smaller than that of the embodiment. According to this, it is possible to reliably avoid a concern that the load exceeding the maximum load weight acts on loading platform portion 21. Further, pressing portion 72 can be formed long and provided to directly stand upon common base 4. In this aspect, moment generated in pressing portion 72 is larger than that in the embodiment, and thus pressing portion 72 needs to be thickened, but connecting member 7 can be omitted. Further, a combination of pressing portion 72 and contacted portion 92 can be replaced with another configuration capable of moving transported object 9 in the horizontal direction. For example, an engaging portion provided on a front surface of driving portion 22 may be engaged with an engaged portion provided on a rear surface of transported object 9, and vehicle body 2 and transported object 9 may move together.

Further, it is not essential to estimate the current position based on the driving amount of traveling wheels 23, and control section 25 may obtain the current position only by detecting the position marker by the sensor and determine the future traveling route. Further, the data format of transported object data DC can be changed in various ways. For example, one item of information, the total weight of transported object 9, can be used instead of two items of information, package weight information W2 and own weight information W1. Further, the total weight of transported object 9 on which a package is placed may be measured, and a measured value of the total weight may be used as transported object data DC. Further, information indicating the height dimension of transported object 9 may be used instead of loading possibility information YN of transported object data DC. In this aspect, control section 25 determines whether loading is possible by comparing the height dimension of transported object 9 with a predetermined limit height dimension at which loading is possible. Various modifications and applications in addition to the embodiment are possible.

REFERENCE SIGNS LIST

1: autonomous transport vehicle, 2: vehicle body, 21: loading platform portion, 22: driving portion, 23: traveling wheel, 25: control section, 28: acquisition section, 3: weight acting portion, 4: common base, 5: elastic support portion, 51: base body, 52: support body, 53: elastic body, 6: drive section, 7: connecting member, 72: pressing portion, 9: transported object, 91: bottom plate, 92: contacted portion, 99: transported object management section, DC: transported object data, DS: lowering stroke length.

The invention claimed is:

1. An autonomous transport vehicle comprising:

a vehicle body that includes a traveling wheel, is configured to enter a lower side of a transported object, and is configured to travel while towing the transported object; and a weight acting portion configured to cause, in a case where a total weight of the transported object is larger than a predetermined weight, a partial weight of the total weight equal to or less than the predetermined weight to act on the vehicle body from the transported object, wherein the weight acting portion includes an elastic support portion that is provided on the vehicle body so as to be capable of being lifted and lowered, and is configured to support the transported object from the lower side via an elastic body, the elastic support portion includes a base body that is provided on the vehicle body so as to be capable of being lifted and lowered, a support body that is provided on the base body so as to be capable of being lifted and lowered, and is configured to support the transported object from the lower side, and the elastic body is provided between the base body and the support body and a stress equal to the predetermined weight is generated in a case where the support body is lowered to a lowered position with reference to the base body.

2. The autonomous transport vehicle according to claim 1, wherein the weight acting portion includes a drive section configured to lift the elastic support portion with respect to the vehicle body such that a stress generated in the elastic body becomes the partial weight.

3. The autonomous transport vehicle according to claim 2, wherein the drive section drives the base body to be lifted and lowered.

4. The autonomous transport vehicle according to claim 3, wherein the drive section lowers the support body to the lowered position with reference to the base body by lifting the base body.

5. The autonomous transport vehicle according to claim 3, wherein a lifting amount of the base body is determined based on a height of a bottom portion of the transported object supported by the support body.

6. The autonomous transport vehicle according to claim 3, wherein the weight acting portion includes a common base provided with multiple sets of the base body, the support body, and the elastic body, and the drive section configured to drive the common base to be lifted and lowered.

7. The autonomous transport vehicle according to claim 3, wherein the weight acting portion includes a connecting member configured to connect at least two base bodies.

8. The autonomous transport vehicle according to claim 1, further comprising:

a pressing portion that is configured to come into contact with a contacted portion provided on the transported object from a lateral side, and is configured to press the transported object as the vehicle body travels.

9. The autonomous transport vehicle according to claim 1, wherein the predetermined weight is a maximum load weight at which the transported object is capable of being loaded and transported without being towed.

10. The autonomous transport vehicle according to claim 9, wherein in a case where the total weight of the transported object is equal to or less than the maximum load weight, the weight acting portion causes a part of the total weight to act on the vehicle body from the transported object to cause the vehicle body to tow the transported object, or causes the total weight to act on the vehicle body from the transported object to cause the transported object to be loaded onto the vehicle body.

11. The autonomous transport vehicle according to claim 1, wherein individual identification information for identifying an individual of the transported object is set for each transported object, and the autonomous transport vehicle further comprises an acquisition section configured to acquire the individual identification information.

12. The autonomous transport vehicle according to claim 11, wherein at least one piece of information from among information on the total weight of the transported object, information on a height of a bottom portion of the transported object into which the vehicle body enters, and information on whether the transported object is capable of being loaded and transported is associated with the individual identification information.

13. A towing and transportation method comprising:

a vehicle body entering step of causing a vehicle body including a traveling wheel to enter a lower side of a transported object;

a weight acting step of causing a partial weight of a total weight of the transported object equal to or less than a predetermined weight to act on the vehicle body from the transported object; and a traveling step of driving the traveling wheel such that the vehicle body travels while towing the transported object.

* * * * *